No. 701,385. Patented June 3, 1902.
C. H. PELTON.
GRAIN DRILL.
(Application filed Apr. 17, 1902.)
(No Model.)

WITNESSES:

INVENTOR.
Charles H. Pelton
BY
ATTORNEY.

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

GRAIN-DRILL.

SPECIFICATION forming part of Letters Patent No. 701,385, dated June 3, 1902.

Application filed April 17, 1902. Serial No. 103,270. (No model.)

*To all whom it may concern:*

Be it known that I, CHARLES H. PELTON, a citizen of the United States, residing at Springfield, in the county of Clark and State of Ohio, have invented certain new and useful Improvements in Grain-Drills, of which the following is a specification, reference being had therein to the accompanying drawings.

This invention relates to grain-drills, and more particularly to a combined grain and fertilizer receiver adapted to receive the grain and fertilizer as they come from their respective distributers and conduct them to the upper end of the seed-tube, by which latter they are in turn conducted to the furrow-opening devices.

My present invention has for its object to provide a receiver which shall not tend to clog unduly, which may be readily inspected and cleaned if clogged, and by means of which all of the grain and all of the fertilizer will be delivered to the seed-tube.

To these ends my invention consists in certain novel features, which I will now proceed to describe and will then particularly point out in the claims.

Figure 1:
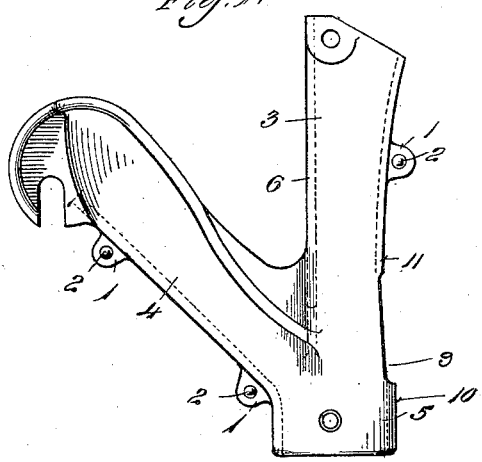
Figure 2:
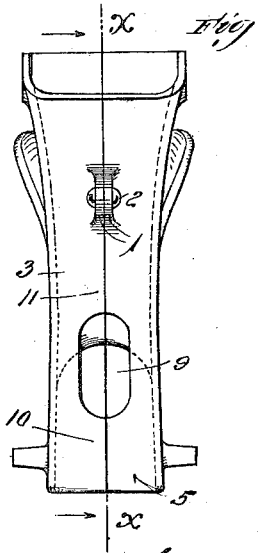
Figure 3:
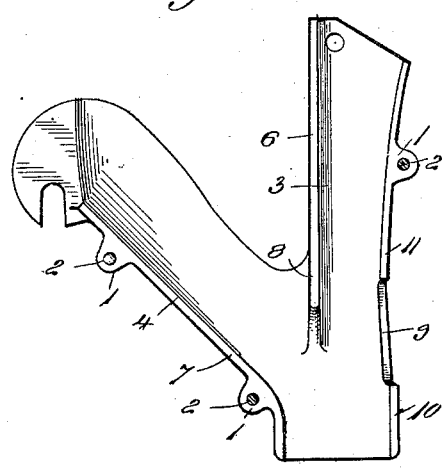
Figure 4:
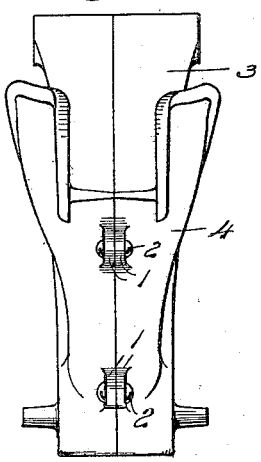
Figure 5:
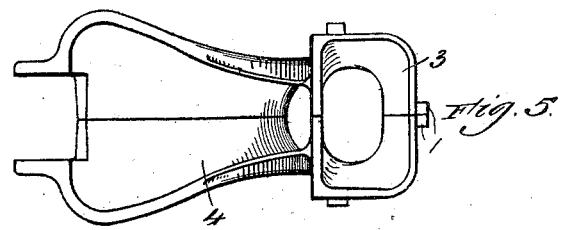

In the accompanying drawings, Figure 1 is a side elevation of a receiver embodying my invention in one form. Fig. 2 is a rear elevation of the same. Fig. 3 is a vertical sectional view taken on the line $x$ $x$ of Fig. 2 and looking in the direction of the arrows. Fig. 4 is a front elevation, and Fig. 5 is a plan view.

The receiver as a whole is preferably constructed in two parts, divided centrally on a vertical plane from front to rear and provided with lugs 1 and rivets 2 or other suitable means for fastening the two halves or sections together. It consists of a substantially vertical fertilizer conduit or tube 3 and an inclined grain tube or conduit 4, the two being united at their lower ends to form a tubular throat or mouth 5, to which the seed-tube is connected. In receivers of this type there is a tendency for the fertilizer to be discharged from the distributer in such a direction as to impinge upon the front wall 6 of the fertilizer-conduit in its fall, and this has sometimes occasioned an accumulation of the fertilizer upon the lower end of the bottom 7 of the seed-conduit, particularly when said seed-conduit is constructed in the form of a trough open at the top, as is usually the case. In order to prevent this deposit, which tends to clog the seed-conduit and prevent the proper discharge of the grain, I extend the front wall 6 of the fertilizer-conduit downward past the point of junction of the fertilizer-conduit and seed-conduit, as indicated at 8. By this means the fertilizer is prevented from lodging on the bottom wall of the grain or seed conduit. In case, however, any clogging should occur on any account at this point and to permit inspection of the interior of the receiver, so as to enable the operator to watch the flow of grain and fertilizer, I provide in the rear wall of the receiver at the point where the fertilizer and seed conduits join an opening 9, by means of which the interior of the receiver may be seen and by which access may be had thereto. The lower edge of this opening is above the line of discharge of the grain, so as to prevent the same from escaping through the opening, and in order to prevent the fertilizer from escaping through said opening the rear wall of the receiver below said opening is deflected outward or rearward, as indicated at 10, beyond the vertical plane of that portion 11 of said rear wall above said opening, so as to prevent the fertilizer in its fall from escaping through the same.

I do not wish to be understood as limiting myself to the precise details of construction hereinbefore described, as the same may obviously be modified without departing from the principle of my invention.

Having thus fully described my invention, what I claim as new, and desire to secure by Letters Patent, is—

1. In a grain-drill, a combined receiver for grain and fertilizer, comprising an inclined seed or grain conduit, and a substantially vertical fertilizer-conduit, said conduits converging and uniting to form a discharge throat or mouth adapted to be connected with a seed-tube, and said receiver being provided with a partition or extension of the front wall of the fertilizer-conduit, extending downward beyond the point of junction of the two conduits, substantially as described.

2. In a grain-drill, a combined fertilizer and grain or seed receiver comprising an inclined grain or seed conduit, and a substantially vertical fertilizer-conduit, the two converging and uniting to form a discharge throat or mouth adapted to be connected with a seed-tube, the rear wall of the receiver opposite the point of junction being provided with an opening, and said rear wall below said opening being extended outward or rearward, substantially as described.

3. In a grain-drill, a combined fertilizer and grain receiver comprising an inclined grain or seed conduit and a substantially vertical fertilizer-conduit, the two converging and uniting to form a discharge throat or mouth adapted to be connected with a seed-tube, said receiver being provided with a partition extending downward between the conduits at their point of junction, and said receiver having in its rear wall an opening opposite said point of junction, the rear wall being extended outwardly below said opening, substantially as described.

In testimony whereof I affix my signature in presence of two witnesses.

CHARLES H. PELTON.

Witnesses:
 AL. H. KUNKLE,
 WILL O'LAUGHLIN.